(12) United States Patent
Ozturk et al.

(10) Patent No.: US 8,520,845 B2
(45) Date of Patent: Aug. 27, 2013

(54) METHOD AND APPARATUS FOR EXPANSION KEY GENERATION FOR BLOCK CIPHERS

(75) Inventors: Erdinc Ozturk, Worcester, MA (US); Kirk S. Yap, Framingham, MA (US); Gilbert Wolrich, Framingham, MA (US); Wajdi K. Feghali, Boston, MA (US); Vinodh Gopal, Westboro, MA (US)

(73) Assignee: Intel Corporation, Santa Clara, CA (US)

( * ) Notice: Subject to any disclaimer, the term of this patent is extended or adjusted under 35 U.S.C. 154(b) by 1505 days.

(21) Appl. No.: 11/760,733

(22) Filed: Jun. 8, 2007

(65) Prior Publication Data

US 2008/0304659 A1    Dec. 11, 2008

(51) Int. Cl.
    *H04L 9/00* (2006.01)
(52) U.S. Cl.
    USPC .............. 380/44; 380/28; 380/37; 713/189
(58) Field of Classification Search
    USPC ................................... 380/37, 44
    See application file for complete search history.

(56) References Cited

U.S. PATENT DOCUMENTS

| | | | | |
|---|---|---|---|---|
| 6,937,727 | B2* | 8/2005 | Yup et al. | 380/37 |
| 7,106,860 | B1* | 9/2006 | Yu et al. | 380/37 |
| 7,158,638 | B2* | 1/2007 | Okada et al. | 380/37 |
| 7,221,763 | B2* | 5/2007 | Verbauwhede | 380/277 |
| 7,257,229 | B1* | 8/2007 | Leshem | 380/277 |
| 7,295,671 | B2* | 11/2007 | Snell | 380/28 |
| 7,561,689 | B2* | 7/2009 | Avasarala et al. | 380/44 |
| 7,613,295 | B2* | 11/2009 | Kurdziel et al. | 380/29 |
| 7,688,974 | B2* | 3/2010 | Lee et al. | 380/37 |
| 7,702,100 | B2* | 4/2010 | Han et al. | 380/28 |
| 2003/0072444 | A1* | 4/2003 | Hu et al. | 380/37 |
| 2003/0198345 | A1 | 10/2003 | Van Buer | |
| 2003/0223580 | A1* | 12/2003 | Snell | 380/28 |
| 2004/0047466 | A1 | 3/2004 | Feldman et al. | |
| 2004/0202317 | A1* | 10/2004 | Demjanenko et al. | 380/28 |
| 2005/0190923 | A1* | 9/2005 | Noh et al. | 380/278 |
| 2005/0271204 | A1* | 12/2005 | Chu | 380/44 |
| 2008/0019504 | A1* | 1/2008 | Han et al. | 380/28 |

OTHER PUBLICATIONS

National Institute of Standards and Technology, FIPS Pub 197: Advanced Encryption Standard (AES). Nov. 26, 2001, 51 pgs.
National Institute of Standards and Technology, An Introduction to Computer Security: The NIST Handbook, Special Publication 800-12, Chapter 19 , pp. 225-239, Oct. 1995 http://www.securiteinfo.com/ebooks/palm/nist-compsec-handbook.pdf.
International Preliminary Report on Patentability received for PCT Application No. PCT/US2008/065685, mailed on Dec. 23, 2009, Intel Corporation, 5 pages.
International Search Report/Written Opinion for Patent Application No. PCT/US2008/065685, mailed Dec. 30, 2008, 6 Pages.

* cited by examiner

*Primary Examiner* — April Y Blair
(74) *Attorney, Agent, or Firm* — Blakely, Sokoloff, Taylor & Zafman LLP

(57) ABSTRACT

A key scheduler performs a key-expansion to generate round keys for AES encryption and decryption just-in-time for each AES round. The key scheduler pre-computes slow operations in a current clock cycle to reduce the critical delay path for computing the round key for a next AES round.

18 Claims, 5 Drawing Sheets

METHOD AND APPARATUS FOR EXPANSION KEY GENERATION FOR BLOCK CIPHERS

FIELD

This disclosure relates to cryptographic algorithms and in particular to the advanced encryption standard (AES) algorithm.

BACKGROUND

Cryptology is a tool that relies on an algorithm and a key to protect information. The algorithm is a complex mathematical algorithm and the key is a string of bits. There are two basic types of cryptology systems: secret key systems and public key systems. A secret key system also referred to as a symmetric system has a single key ("secret key") that is shared by two or more parties. The single key is used to both encrypt and decrypt information.

The Advanced Encryption Standard (AES), published by the National Institute of Standards and Technology (NIST) as Federal Information Processing Standard (FIPS) 197 is a secret key system. AES is a symmetric block cipher that can encrypt and decrypt information.

Encryption (cipher) performs a series of transformations using the secret key (cipher key) to transform intelligible data referred to as "plaintext" into an unintelligible form referred to as "cipher text". The transformations in the cipher include (1) Adding a round key (value derived from the cipher key) to the state (a two dimensional array of bytes) using a Exclusive OR (XOR) operation; (2) Processing the state using a non-linear byte substitution table (S-Box) (3) Cyclically shifting the last three rows of the state by different offsets; and (4) Taking all of the columns of the state and mixing their data (independently of one another) to produce new columns.

Decryption (inverse cipher) performs a series of transformations using the cipher key to transform the "cipher text" blocks into "plaintext" blocks of the same size. The transformations in the inverse cipher are the inverse of the transformations in the cipher.

The Rijindael algorithm is specified in the AES standard to process data blocks of 128 bits, using cipher keys with lengths of 128, 192 and 256 bits. The different key lengths are typically referred to as AES-128, AES-192 and AES-256.

The AES algorithm transforms the plaintext into cipher text or cipher text into plaintext in 10, 12, or 14 consecutive rounds, with the number of rounds dependent on the length of the key.

BRIEF DESCRIPTION OF THE DRAWINGS

Features of embodiments of the claimed subject matter will become apparent as the following detailed description proceeds, and upon reference to the drawings, in which like numerals depict like parts, and in which:

Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

The Advanced Encryption Standard (AES) algorithm is a compute intensive algorithm that is typically performed in software or in a special purpose processor. Thus, encryption is typically only used for encrypting a subset of the information stored in computers, for example, information that may be classified as "top secret". However, there is a need to encrypt more of the information that is stored on computers. For example, if all information stored on a mobile computer was encrypted, this information would be protected in the event that the mobile computer was stolen.

The AES algorithm transforms plaintext into cipher text or cipher text into plaintext in 10, 12, or 14 consecutive rounds, with the number of rounds dependent on the length of a cipher key. The cipher key is a secret, cryptographic key that is used by key expansion to generate a set of round keys that can be viewed as a rectangular array of bytes, having four rows and Nk columns.

A key scheduler expands the n-bytes of the cipher key into a series of round keys which will be referred to as b-bytes of an expanded key. The first n-bytes of the b-bytes of the expanded key is the cipher key. For example, for a 128-bit cipher key, the 128-bit cipher key is expanded into a 176-bit expanded key, that is, 11×16-bytes, with the first 16-bytes being the 128-bit cipher key and the next 160 bytes being a series of 10 round keys. The 24 bytes of a 192-bit cipher key are expanded into 208 bytes (13×16 bytes) to provide 12 "round keys" one for each of the 12 rounds and the 32 bytes of a 256-bit cipher key are expanded into 240 bytes (15×16 bytes) to provide 14 "round keys" one for each of the 14 rounds.

However, storing the pre-computed expanded key consumes a large amount of memory. Instead of pre-computing the expanded key from the cipher key and storing it in memory, an on-the-fly key scheduler according to an embodiment of the present invention computes "round keys" on-the-fly, that is, as a round key is needed for each aes decrypt/encrypt round.

In one embodiment, in order to reduce the time to compute each round key, the on-the-fly key scheduler outputs a round key per clock cycle. Furthermore, the on-the-fly key scheduler generates the round key independent of the size of the cipher key. Computations for computing a round key per cycle are scheduled without the need for additional registers and result in a decrease in the critical timing path.

Figure 1:
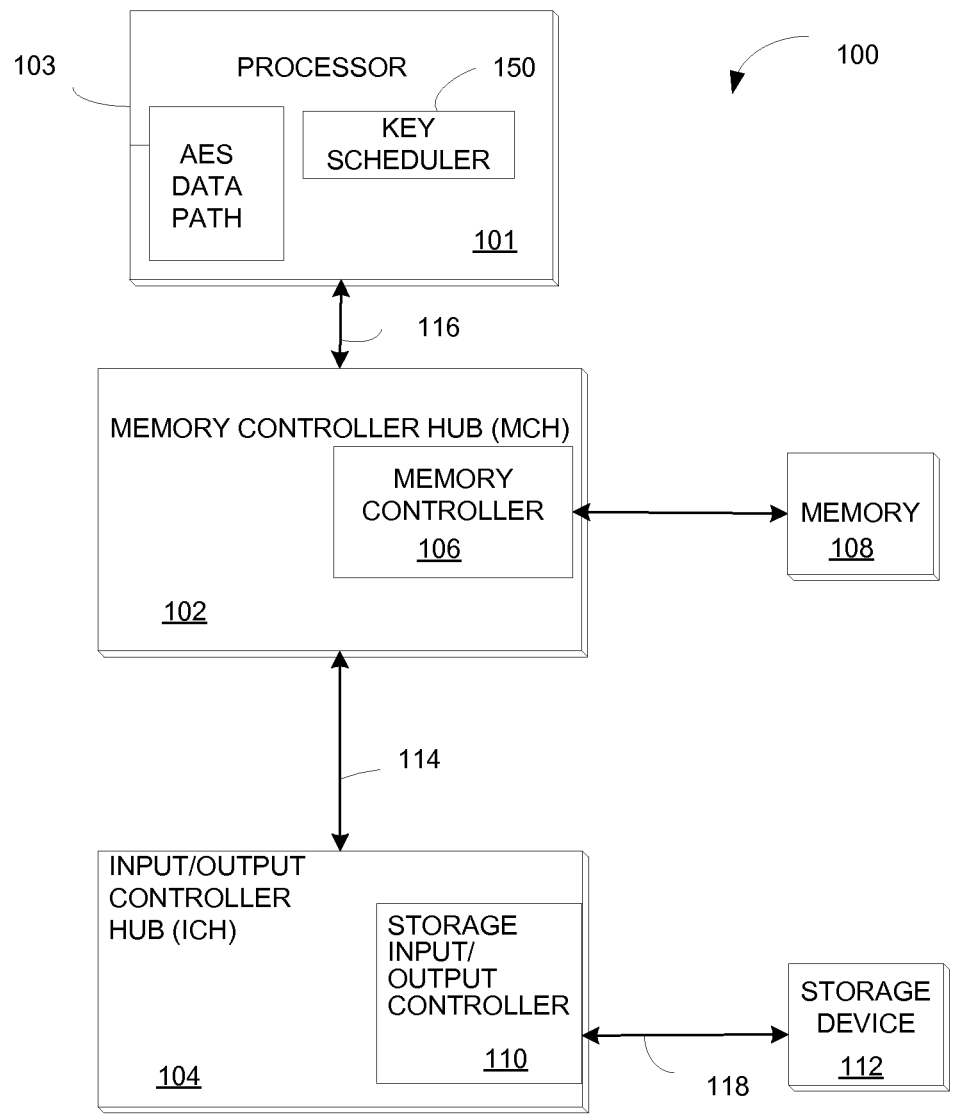
FIG. 1 is a block diagram of a system that includes an embodiment of an on-the-fly key scheduler for expanding a cipher key to generate a round key per clock cycle according to the principles of the present invention.

FIG. 1 is a block diagram of a system 100 that includes an embodiment of an on-the-fly key scheduler 150 for expanding a cipher key to generate a round key per clock cycle according to the principles of the present invention. The system 100 includes a processor 101, a Memory Controller Hub (MCH) 102 and an Input/Output (I/O) Controller Hub (ICH) 104. The MCH 102 includes a memory controller 106 that controls communication between the processor 101 and memory 108. The processor 101 and MCH 102 communicate over a system bus 116.

The processor 101 may be any one of a plurality of processors such as a single core Intel® Pentium IV® processor, a single core Intel Celeron processor, an Intel® XScale processor or a multi-core processor such as Intel® Pentium D, Intel® Xeon® processor, or Intel® Core® Duo processor or any other type of processor.

The memory 108 may be Dynamic Random Access Memory (DRAM), Static Random Access Memory (SRAM), Synchronized Dynamic Random Access Memory (SDRAM), Double Data Rate 2 (DDR2) RAM or Rambus Dynamic Random Access Memory (RDRAM) or any other type of memory.

The ICH 104 may be coupled to the MCH 102 using a high speed chip-to-chip interconnect 114 such as Direct Media Interface (DMI). DMI supports 2 Gigabit/second concurrent transfer rates via two unidirectional lanes.

The ICH 104 may include a storage I/O controller 110 for controlling communication with at least one storage device 112 coupled to the ICH 104. The storage device may be, for example, a disk drive, Digital Video Disk (DVD) drive, Compact Disk (CD) drive, Redundant Array of Independent Disks (RAID), tape drive or other storage device. The ICH 104 may communicate with the storage device 112 over a storage protocol interconnect 118 using a serial storage protocol such as, Serial Attached Small Computer System Interface (SAS) or Serial Advanced Technology Attachment (SATA).

The processor 101 includes an AES function 103 to perform aes encryption and decrypt operations. The AES function 103 may be used to encrypt or decrypt information stored in memory 108 and/or stored in the storage device 112 using round keys computed by the on-the-fly key scheduler 150.

Figure 2:
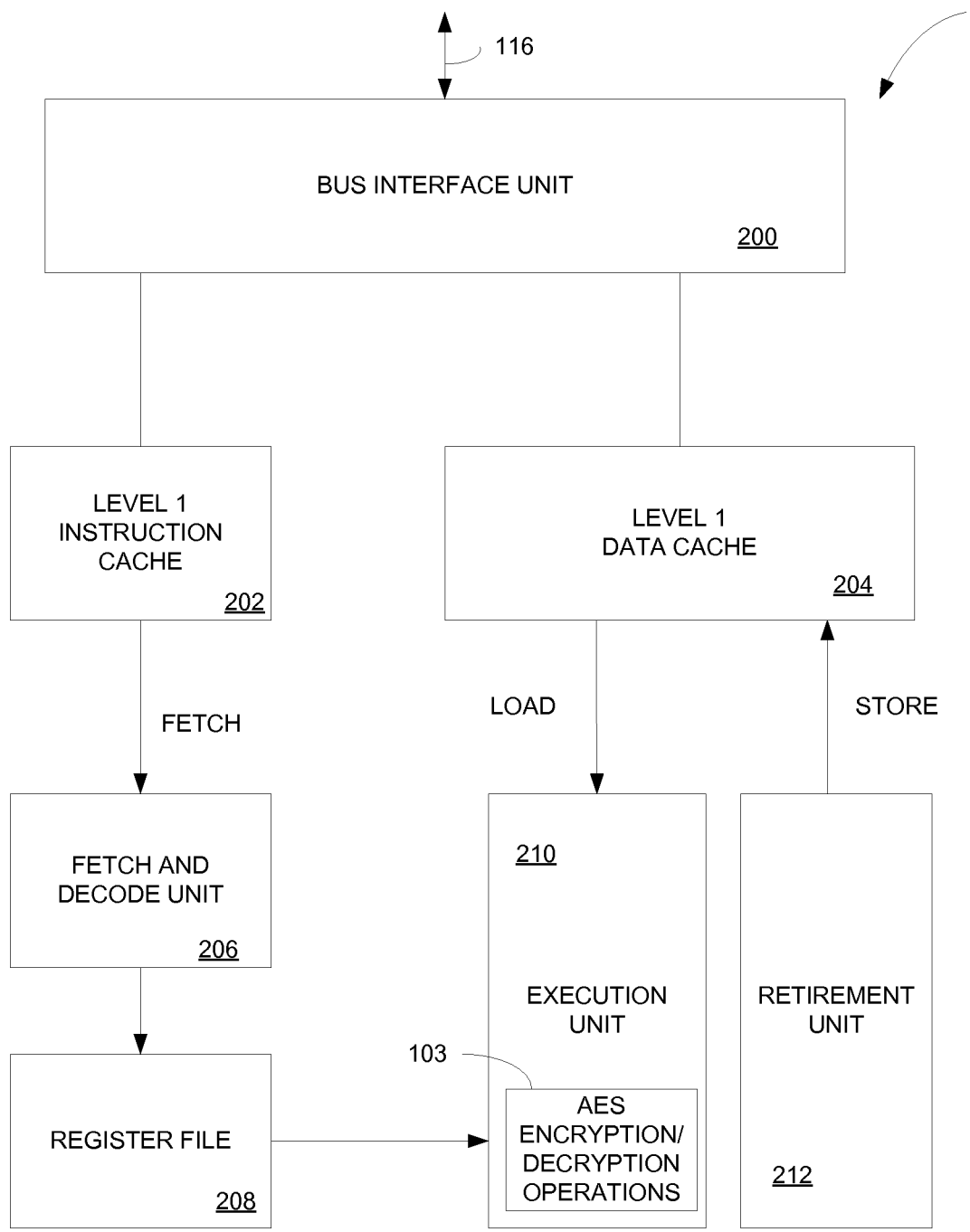
FIG. 2 is a block diagram of an embodiment of the processor shown in FIG. 1.

FIG. 2 is a block diagram of an embodiment of the processor 101 shown in FIG. 1. Processor 101 includes a fetch and decode unit 202 for decoding processor instructions received from Level 1 (L1) instruction cache 202. Data to be used for executing the processor instructions may be stored in register file 208. In one embodiment, the register file 208 includes a plurality of 128-bit registers, which are used by an aes instruction to store data for use by the aes instruction.

In one embodiment, the register file is a group of 128-bit registers similar to the 128-bit MMX registers provided in Intel Pentium MMX Processors that have a Streaming (Single Instruction Multiple Data (SIMD)) Extension (SSE) Instruction set. In a SIMD processor, data is processed in 128-bit blocks which may be loaded at one time. Instructions may be applied to a 128-bit block (16 bytes) in one operation.

The fetch and decode unit 202 fetches macroinstructions from L1 instruction cache 202, decodes the macroinstructions and breaks them into simple operations called micro operations (µops). The execution unit 210 schedules and executes the micro operations. In the embodiment shown, the aes function 103 in the execution unit 210 includes micro operations for the aes instruction. The retirement unit 212 writes the results of the executed instructions to registers or memory.

Figure 3:
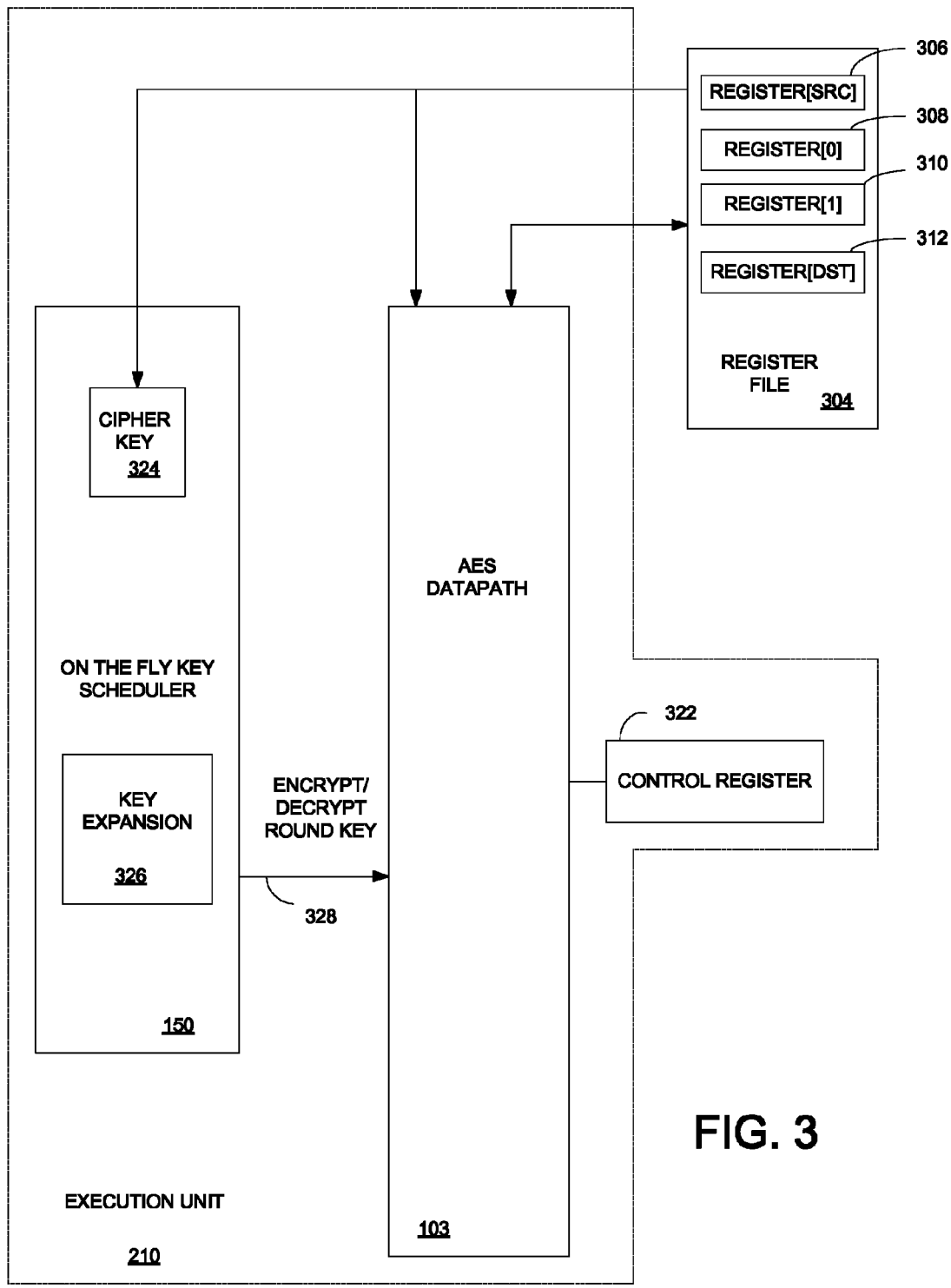
FIG. 3 is a block diagram of a portion of the processor shown in FIG. 2 that includes an embodiment of an execution unit shown in FIG. 2 for performing AES encrypt and decrypt operations.

FIG. 3 is a block diagram of a portion of the processor 101 shown in FIG. 1 that includes an embodiment of an execution unit 210 shown in FIG. 2 for performing AES encrypt and decrypt operations.

AES has a fixed block size of 128 bits and a cipher key size of 128, 192 or 256 bits and operates on a 4×4 (16 bytes (128-bit fixed block size)) array of bytes, which is referred to as the 'state'. The AES algorithm transforms a 128-bit plaintext block into a 128-bit block of cipher text (encrypts) or a 128-bit block of cipher text into a 128-bit block of plaintext (decrypts) in 10, 12, or 14 consecutive rounds, with the number of rounds dependent on the size of the cipher key (128, 192 or 256-bits).

Table 1 below shows an example of the 128-bit result of performing an AES encrypt operation using a 128-bit key on a 128-bit block input as defined in by the Advanced Encryption Standard (AES), published by the National Institute of Standards and Technology (NIST) as Federal Information Processing Standard (FIPS) 197 (hereinafter referred to as "FIPS 197").

TABLE 1

| | |
|---|---|
| 128-bit Input: | 00112233445566778899aabbccddeeff (Hexadecimal) |
| 128-bit Key: | 000102030405060708090a0b0c0d0e0f (Hexadecimal) |
| 128-bit Result: | 69c4e0d86a7b0430d8cdb78070b4c55a (Hexadecimal) |

In an embodiment, an AES instruction (macro instruction) to perform AES encrypt or decrypt in the aes data path 103 may be defined symbolically as:

```
REG[dest] = aes(REG[src],
                key-size={128, 192, 256},
                #rounds={1,10,12,14},
                op={encrypt/decrypt},
                special_last_round={true/false} )
```

Upon decoding the aes instruction, a number of parameters to be used to control the flow in each aes round may be stored in a control register 322. The parameters include the size of the cipher key (128-bits, 192-bits or 256-bits), number of rounds (1, 10, 12 or 14), the type of operation (encrypt/decrypt) and whether there is a special last round. AES micro operations perform n rounds of AES accordingly based on the value of n. With a number of rounds value of 10, 12, 14, the aes micro operations may perform the current standard aes a cipher key size of 128-bits, 192-bits or 256-bits. By allowing the type of round (last or not last) to be programmable, an AES-like cipher with 20 rounds (with an AES-style last round), or only a "one round" pass may be performed using the same aes instruction and aes micro operations.

When the operation (op) that is selected is encrypt (cipher), the AES data path 103 performs a series of transformations using a secret key (cipher key) to transform intelligible data referred to as "plaintext" into an unintelligible form referred to as "cipher text" as shown above in Table 1. The transformations in the cipher that are performed by the aes data path 103 for each of the rounds (1, 10, 12 or 14) with a round key 328 provided by the on-the-fly key scheduler 150 include: (1) adding a round key (value derived from the cipher key) to the state (a two dimensional array of bytes) using a Exclusive OR (XOR) operation; (2) processing the state using a non-linear byte substitution table (S-Box); (3) cyclically shifting the last three rows of the state by different offsets; and (4) taking all of the columns of the state and mixing their data (independently of one another) to produce new columns. If the "special_last_round" is "true" transformation (4) is not performed for the last round.

The register file 304 has a plurality of 128-bit registers (REG) which may be used by the AES instruction. One of the 128-bit registers REG[SRC] is designated to store a source operand for the first aes round and another one of the 128-bit registers REG[dst] to store the result of the aes instruction. A 128-bit data block to be encrypted or decrypted by the aes instruction is loaded into a source register REG[SRC] 306 in the register file 304 prior to issuing the aes instruction. The source operand is transformed in a number of rounds (1, 10, 12 or 14) to provide the result of the encrypt/decrypt of the 128-bit source data. The source operand may be 128-bits of plaintext to be encrypted using the cipher key or 128-bits of cipher text to be decrypted using the cipher key.

After an aes instruction has been decoded by the fetch and decode unit 206, the execution of the aes instruction by the execution unit 210 involves performing the micro operations associated with the aes instruction. The execution unit 210 retrieves the source operand and the cipher key that are stored in the register file 304 prior to performing the encrypt or decrypt operation using the micro operations for the aes instruction. In the embodiment shown, the source operand [SRC] (128-bit block state) is stored in source register 306 and the 128-bit, 192-bit or 256-bit cipher key is stored in register(s) 308, 310 in the register file 304. In other embodiments other registers in the register file 304 may be used to store the cipher key and the source operand.

In the case of a 128-bit cipher key, the entire 128-bits of the cipher key are stored in one of the 128-bit registers in the register file 304, for example, register 308. For key sizes greater than 128 bits, the most significant bits (greater than 128 bits) are stored in another 128-bit register, for example, register 310. The key size parameter indicates whether the cipher key is stored in one register or more than one register in the register file 304. The one or more registers in the register file 304 that store the cipher key are not modified during the execution of the aes instruction. After the execution of the aes instruction is complete, the result of the encrypt/decrypt operation (cipher text or plain text) [dst] is stored in register 312 in the register file 304.

The on-the-fly scheduler 300 includes a 256-bit key register ("cipher key") 324 to store the cipher key from which the expanded key (round keys) is derived. The key expansion 326 in the on-the-fly key scheduler 150 derives the expanded key (round keys) from the cipher key. Each encrypt/decrypt "round key" 328 of the expanded key is generated on-the-fly, that is, as it is needed for the next aes encrypt/decrypt round in the aes datapath 103. The encrypt/decrypt round key 328 is forwarded to the aes datapath 103 for use in the next aes round.

Each 128-bit portion of the expanded key (round key) is generated independent of the size of the cipher key which decreases the dependencies in a single clock cycle and decreases the critical path with respect to generating the expanded key for a 192-byte cipher key or 256-bit cipher key.

The cipher key 324 may be considered to be a rectangular array of bytes, having 4 rows and Nk columns that is used by key expansion 326 to derive the round keys (expanded key). The number of columns (Nk) and the number of rounds (Nr) is a function of the size of the cipher key. For the AES algorithm defined in FIPS 197, the length of the input block is 128-bits which is represented by Nb=4. The number of bytes in the expanded key is represented by Nb. The values of Nk, Nr and Nb for each cipher key length is shown in Table 2 below:

TABLE 2

| Cipher Key sz | Cipher Key Len (Nk) | No. of rounds (Nr) | Expanded Key |
|---|---|---|---|
| 128-bits | 4 | 10 | w0:w43 |
| 192-bits | 6 | 12 | w0:w51 |
| 256-bits | 8 | 14 | w0:w59 |

Cipher key length (Nk) is the number of 32-bit words (number of columns) in the cipher key. At the start of a block encrypt or decrypt, the cipher key is loaded into the 256-bit key register 326 from one or both registers 308, 310 in the register file 304 dependent on the size of the key (128, 192 or 256 bits).

The key expansion 326 expands the n-bytes of the cipher key stored in register 304 into (Nb*(Nr+1)) words of an expanded key with the first four (Nb) words of the expanded key being the cipher key. Each of the Nr rounds requires four (Nb) 32-bit words of key data. The other round keys are derived from these initial four words as defined in FIPS 197. The resulting key schedule is a linear array of 32-bit words, denoted $w_i$.

The key expansion 324 in the on-the-fly key scheduler 300 derives a 128-bit (4×32-bit words) round key per clock cycle, that is, it produces the round key for use by an aes encrypt/decrypt round operation in the aes data path 103 every clock cycle with the clock cycle being dependent on the process technology. For example, a 128-bit (4×32-bit words) cipher key is expanded into an expanded key having 11×128-bit round keys, with each round key having 4×32-bit words. Thus, the expanded key for a 128-bit cipher key has a total of 44 32-bit words which may be labeled w0-w43. The expanded key for a 192-bit cipher key has 52 32-bits words (w0:w51) and the expanded key for a 256-bit cipher key has 60 32-bit words (w0:w59).

A 128-bit round key is generated on-the-fly by manipulating 32-bit words from the previous round key based on Equations 1 below as specified by FIPS 197.

$$wn = \text{temp} \oplus w(n-Nk) \qquad \text{Equation 1}$$

n is the word number (0:59), Nk=4, 6, or 8 as shown in Table 2 and temp is the result of a function (SubWord) that is performed on the previous word, that is, temp=f(w(n−1)) as specified in FIPS 197 by the pseudo code shown in Table 3 below:

TABLE 3

```
while (i < Nb * (Nr+1))
    temp = w[i−1]
    if (i mod Nk = 0)
        temp = SubWord (RotWord (temp) xor Rcon [i/Nk]
    else if (Nk > 6 and i mod Nk = 4)
        temp = SubWord (temp)
    end if
    w[i] = w[i − Nk] xor temp
    i = i + 1
end while
```

SubWord is a function that takes a four-byte input 32-bit word and applies an S-box to each of the four bytes to produce a 32-bit output word The SubWord function (32 bits) results in 4 independent (parallel) SubByte operations (8-bits). An S-box is a non-linear substitution table used to perform a one-for-one substitution of a byte value. RotWord is a function that takes a four-byte 32-bit word and performs a cyclic permutation. Rcon is a round constant word array.

Figure 4:
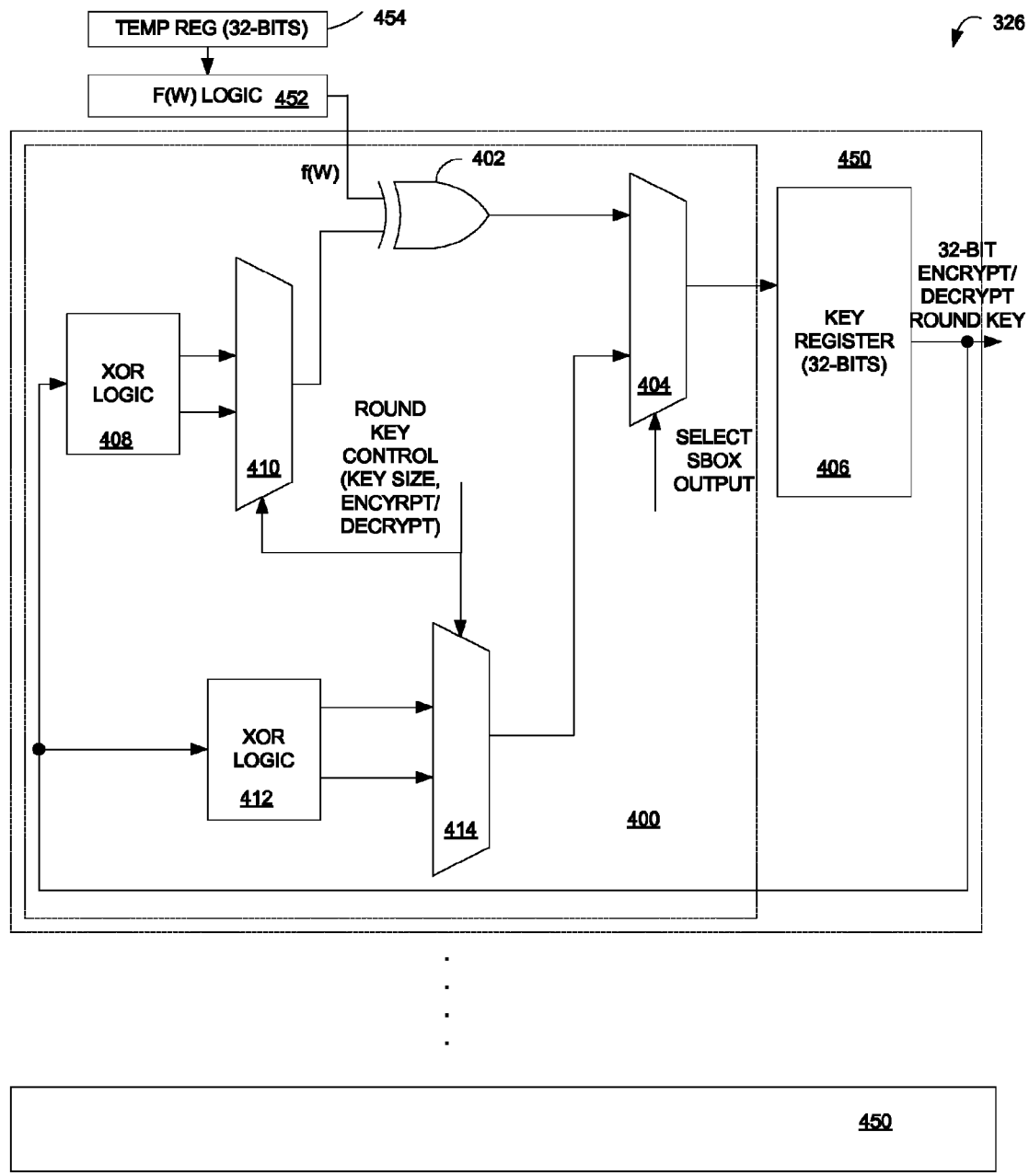
FIG. 4 is a block diagram of an embodiment of key expansion according to the principles of the present invention.

FIG. 4 is a block diagram of an embodiment of key expansion 326 according to the principles of the present invention. FIG. 4 illustrates 32-bit key generation 450 that includes 32-bit key expansion 400 and a 32-bit key register 406 used for computing 32-bits of the 128-bit round key, that is, any one of the 32-bit words in key register[7]-key register[0] shown in Tables 4-9. In an embodiment, key expansion 326 includes a 32-bit register 406 to store 32-bits of cipher key. In the key expansion 326, there are 8 instantiations of 32-bit key generation 450, one for each of the 32-bit words w7-w0. The w3:w0 value is the initial 128-bit key which is used in the AES algorithm, therefore the key expansion 326 does not need to output these values as they are only input to the on-the-fly key scheduler 150 used to generate other round keys.

At the start of a block encrypt/decrypt instruction, the 8 32-bit registers 406 are loaded with the 256-bits of the cipher key. A state machine 400 performs a key expansion to generate a round key prior to each aes encrypt/decrypt round. The 8 32-bit registers 406 may store a 128-bit, 192-bit or 256-bit cipher key.

The state machine 400 computes round keys on-the-fly starting three clock cycles before the cipher key is first used in the aes data path 103. XOR logic 408, 412 pre-computes the portion of the round key that requires XOR operations based on Equation 1 using pre-computed words of the expanded key stored in register 406. XOR logic 408, 412 performs the XOR operations while the f(w) portion of the round key is being computed. Multiplexers 404, 416 allow the hardware state machine 400 to compute the expansion key for different cipher key sizes (128-bit, 192-bit, 256-bit) and different operations (encrypt/decrypt).

The operation of expansion key 326 shown in FIG. 4 will be described for different cipher key sizes (128-bit, 192-bit, 256-bit) and different operations (encrypt/decrypt).

The generation of the expanded key for a 128-bit cipher key, that is, the expanded key for 10 encrypt rounds is shown below in Table 4. Table 4 illustrates the contents of the key register 406 and the temporary register ("Temp") during each aes encrypt round for a 128-bit cipher key. With a 128-bit cipher key, the number of columns (Nk) is 4 and the number of rounds (Nr) is 10.

TABLE 4

| | Key Register (256 bits (32-bit words (7:0)) | | | | | | | |
| --- | --- | --- | --- | --- | --- | --- | --- | --- |
| Round # | 7 | 6 | 5 | 4 | 3 | 2 | 1 | 0 | Temp |
| 0 | X | X | X | X | X | X | X | X | w3 |
| 1 | X | X | X | X | w7 | w6 | w5 | w4 | w7 |
| 2 | X | X | X | X | w11 | w10 | w9 | w8 | w11 |
| 3 | X | X | X | X | w15 | w14 | w13 | w12 | w15 |
| 4 | X | X | X | X | w19 | w18 | w17 | w16 | w19 |
| 5 | X | X | X | X | w23 | w22 | w21 | w20 | w23 |
| 6 | X | X | X | X | w27 | w26 | w25 | w24 | w27 |
| 7 | X | X | X | X | w31 | w30 | w29 | w28 | w31 |
| 8 | X | X | X | X | w35 | w34 | w33 | w32 | w35 |
| 9 | X | X | X | X | w39 | w38 | w37 | w36 | w39 |
| 10 | X | X | X | X | w43 | w42 | w41 | w40 | w3 |

When performing a 128-bit encrypt operation, the first 128-bit round key in the expanded key is the 128-bit cipher key, that is, words w3-w0. At the start of the encrypt operation, the 128-bits of the cipher key (w3:w0) are forwarded to the aes data path 103. While the cipher key (w3:w0) is being used in the first aes round in the aes data path 103, the round key for the next round (aes round key 2) is being computed by key expansion 326. A temporary register (temp) 454 stores w3 from the cipher key (w0:w3) which is used to compute words w7:w4 for aes round key 2 as specified in FIPS 197 by Equation 1. The temporary register 454 stores the 32-bit data for the SubWord function. The SubWord function is used in the function shown in Table 3.

With 256-bits available in the key register 406 for storing the 128-bit cipher key, the non-used 128-bits of the 256-bit key register 406 may be used to temporarily store pre-computed words of the expanded key for use in generating the 128-bit round key for subsequent rounds in the case of a 128-bit cipher key.

Thus, the high-order 128 bits in the example shown above in Table 3) may be used to temporarily store pre-computed words for use in computing subsequent round keys. The storing of pre-computed words of the expanded key for computing subsequent round keys allows round keys to be generated on the fly in a single clock cycle without adding delay to the critical delay path.

The low order words (w3:w0) in the 256-bit register 406 will be referred to as the "output register" because they are used to store the 128-bit round key to be forwarded to the aes data path 103. The high order words (w7:w4) in the 256-bit register 406 will be referred to as the "pre-compute register" because they are used to store the pre-computed words of the expanded key for use in computing subsequent round keys.

Word w4 for round key 2 in Table 3 is computed as shown in Equation 2 which is derived by substituting n=4 and Nk=4 in Equation 1.

$$w4 = f(w3) \oplus (w0 \qquad \text{Equation 2}$$

The computation of w4 requires performing a function on w3 (f(w3)). The function is performed as shown in the pseudo code shown in Table 3. The value of w3 is pre-computed (cipher key) and is available from the prior round. Thus, while w3 is being used in the aes data path 103 for aes round 1, it is also stored in a temporary register so that the function on w3 can be performed in the clock cycle prior to the clock cycle in which the result of the function on w3 is required to compute w4 for round key 2.

The other three words (w5, w6, w7) of the expanded key used for round key 2 may be computed using the result of f(w3) and other words w0-w2 from the previous round key in the clock cycle after f(w3) is computed as shown in Equations 3-5 below:

$$w5 = w4 \oplus w1 = f(w3) \oplus w0 \oplus w1 \qquad \text{Equation 3}$$

$$w6 = w5 \oplus w2 = f(w3) \oplus w0 \oplus w1 \oplus w2 \qquad \text{Equation 4}$$

$$w7 = w6 \oplus w3 = f(w3) \oplus w0 \oplus w1 \oplus w2 \oplus w3 \qquad \text{Equation 5}$$

Equations 2-5 above illustrate how the key scheduler 150 uses w3:w0 to compute w7:w4. In the first round, the on-the-fly key scheduler 150 outputs computed words w7:w4.

As can be seen from the equations, word w3 is stored in the key register 406 1 clock cycle before the first round. When word w3 is stored in the temporary register 454, f(w) logic 452 computes the f(w3) value. The computed f(w3) value is forwarded to the 32-bit key expansion 400 for each word (w7:w0). Using f(w3), words w7:w4 values are computed as shown in equations 2-5 in the respective key expansion 400 for each word (w7:w0). When words w7:w4 have been computed by respective expansion logic 400, the words are registered in the 32-bit word registers 406 at the next (rising or falling) edge of the clock cycle. The value w7 is stored in the temporary register 454 at the same next edge of the clock cycle for use in computing f(w7) which will be used to compute the next round key.

As f(w3) has been pre-computed in the prior clock cycle each of w5-w7 may be derived from the result of f(w3). Words (w3:w0) are known from the round key of the previous round as shown in Equations 3-5. Thus, words (w7-w4) for the next round key may be computed on-the-fly for aes round 2 using pre-computed f(w3) and words w3:w0.

The other round keys for the 128-bit cipher key are computed in a similar manner using a pre-computed word for a prior round that is stored in the temporary register 454 as shown in Table 4.

Additional bits of the 256-bit register are used to store words for generating each 128-bit encrypt round key for a 192-bit cipher key as shown below in Table 5.

TABLE 5

| Round | Key register (256 bits (32-bit words (7:0)) | | | | | | | |
|---|---|---|---|---|---|---|---|---|
| Key # | 7 | 6 | 5 | 4 | 3 | 2 | 1 | 0 | Temp |
| 1 | w7' | w6' | w5 | w4 | w7 | w6 | w5 | w4 | w5 |
| 2 | w11' | w10' | w9' | w8' | w11 | w10 | w9 | w8 | w5 |
| 3 | w15' | w14' | w13' | w12' | w15 | w14 | w13 | w12 | w11 |
| 4 | w19' | w18' | w17 | w16 | w19 | w18 | w17 | w16 | w17 |
| 5 | w23' | w22' | w21' | w20' | w23 | w22 | w21 | w20 | w17 |
| 6 | w27' | w26' | w25' | w24' | w27 | w26 | w25 | w24 | w23 |
| 7 | w31' | w30' | w29 | w28 | w31 | w30 | w29 | w28 | w29 |
| 8 | w35' | w34' | w33' | w32' | w35 | w34 | w33 | w32 | w29 |
| 9 | w39' | w38' | w37' | w36' | w39 | w38 | w37 | w36 | w35 |
| 10 | w43' | w42' | w41 | w40 | w43 | w42 | w41 | w40 | w41 |
| 11 | w47' | w46' | w45' | w44' | w47 | w46 | w45 | w44 | w41 |
| 12 | w51' | w5'0 | w49' | w48' | w45 | w44 | w43 | w42 | w47 |
| 13 | w7' | w6' | w5 | w4 | w51 | w50 | w49 | w48 | w5 |

With 256-bits available in the 256-bit key register 406 for storing the 192-bit cipher key, the non-used 64-bits of the 256-bit key register 406 may also used to temporarily store pre-computed 32-bit words for use in generating the 128-bit round key for subsequent rounds. A 192-bit cipher key has 6 32-bit words (Nk). Thus, the 192-bit cipher key includes 32-bit words labeled w5:w0. The next 6 words w11:w6 are computed using w5:w0. Thus, based on the pseudo code shown in Table 1 above the 128-bit round key for the first round is computed as follows, if n mod 6 is 0

$$w_n = f(w_{n-1}) \oplus w_{n-6}$$

$\oplus$ else $$w_n = w_{n-1} \oplus w_{n-6}$$

For example, to compute $w_6$ as 6 mod 6 is 0, thus $$w_6 = f(w_5) \oplus w_0$$

Having computed $w_6$, the next 5 32-bit words of the expansion key, that is, $w_{11}$-$w_7$ (n mode 6 not equal to 0) may be computed using $w_6$ as follows:

$$w_6 = f(w_5) \oplus w_0$$

$$w_7 = f(w_5) \oplus w_0 \oplus w_1$$

$$w_8 = f(w_5) \oplus w_0 \oplus w_1 \oplus w_2$$

$$w_9 = f(w_5) \oplus w_0 \oplus w_1 \oplus w_2 \oplus w_3$$

$$w_{10} = f(w_5) \oplus w_0 \oplus w_1 \oplus w_2 \oplus w_3 \oplus w_4$$

$$w_{11} = f(w_5) \oplus w_0 \oplus w_1 w_2 \oplus w_3 \oplus w_4 \oplus w_5$$

In an embodiment, the low-order 128-bits of the 256-bit register are used for storing values to be output as the next 128-bit round key and the high-order 128-bits of the 256-bit register 406 are used to store pre-computed words for subsequent round keys. Also, word w5 is stored in the temporary register (temp reg) 254 (registered) prior to performing $f(w_5)$.

As words w5:w0 are available prior to the computation of $f(w_5)$, the XORs may be pre-computed through XOR logic 412 and stored in high-order bits of the 256-bit register 406. The pre-computed results from the XOR logic 412 are stored as w6':w11' and are computed as follows:

$$w_6' = w_0$$

$$w_7' = w_0 \oplus w_1$$

$$w_8' = w_0 \oplus w_1 \oplus w_2$$

$$w_9' = w_0 \oplus w_1 \oplus w_2 \oplus w_3$$

$$w_{10}' = w_0 \oplus w_1 \oplus w_2 \oplus w_3 \oplus w_4$$

$$w_{11}' = w_0 \oplus w_1 \oplus w_2 \oplus w_3 \oplus w_4 \oplus w_5$$

After, $f(w_5)$ is computed and is valid at the input of XOR 402, words w11:w6 are computed through XOR logic 408 and multiplexer 410 using words w6':w11' as follows:

$$w_6 = f(w_5) \oplus w_6'$$

$$w_7 = f(w_5) \oplus w_7'$$

$$w_8 = f(w_5) \oplus w_8'$$

$$w_9 = f(w_5) \oplus w_9'$$

$$w_{10} = f(w_5) \oplus w_{10}'$$

$$w_{11} = f(w_5) \oplus w_{11}'$$

As $w_6$ and $w_7$ are computed and moved to the low order 128-bits of the 256-bits register 406 to provide round key 2, $w_8'$, $w_9'$, $w_{10}'$, and $w_{11}'$ are computed and stored in the high-order 128-bits of 256-bit register 406 ready to be moved to the low-order 128-bits of the 256-bit register 406 when computing round key 3.

This provides round 2 key (w4:w7) and round 3 key (w8:w12). The next six expansion SubWords are computed as follows:

To compute $w_{12}$, 12 mod 6 is 0, thus $$w_{12} = f(w_{11}) \oplus w_6$$

$$w_{13} = f(w_{11}) \oplus w_6 \oplus w_7$$

$$w_{14} = f(w_{11}) \oplus w_6 \oplus w_7 \oplus w_8$$

$$w_{15} = f(w_{11}) \oplus w_6 \oplus w_7 \oplus w_8 \oplus w_9$$

$$w_{16} = f(w_{11}) \oplus w_6 \oplus w_7 \oplus w_8 \oplus w_9 \oplus w_{10}$$

$$w_{17} = f(w_{11}) \oplus w_6 \oplus w_7 \oplus w_8 \oplus w_9 \oplus w_{10} \oplus w_{11}$$

The pre-computed XOR functions are stored as w17':w12' and are computed as follows:

$$W_{12}' = w_6$$

$$W_{13}' = w_6 \oplus w_7$$

$$W_{14}' = w_6 \oplus w_7 \oplus w_8$$

$$w_{16}' = w_6 \oplus w_7 \oplus w_8 \oplus w_9 \oplus w_{10}$$

$$w_{17}' = w_6 \oplus w_7 \oplus w_8 \oplus w_9 \oplus w_{10} \oplus w_{11}$$

As words $w_{12}$ through $w_{15}$ are being computed and moved to the lower 128-bits of the 256-bits register, words w17 and w16 are also pre-computed and moved to the next higher order 64-bits ready for computation of the next round key. Thus, the computation of the round keys is symmetric for 3 round keys due to the 192-bit (6 32-bit word) cipher key and the 128-bit (4 32-bit word) round key as shown in Table 4.

All 256-bits of the 256-bit register 406 are used for storing 32-bit words for generating 128-bit round keys for a 256-bit cipher key as shown below in Table 4. For 128-bit encryption the 32 bytes of a 256-bit cipher key are expanded into 240 bytes (15×16 bytes) to provide 14 round keys, one for each of the 14 rounds. Thus, there are 60 32-bit words, which are labeled w59:w0.

In the case of a 256-bit cipher key, all of the 256-bits in the 256-bit register are used to store 32-bit words for computing round keys. The 256-bit cipher key includes words w8-w0 of the expanded key, and includes words w7:w4 for round key 2. These words are stored in the 256-bit key register 406 for computing words w11:w8 for round key 3 and words w15: w12 for round key 4.

The low order 128-bits of the 256-bit cipher key stored in the low order 128-bits of the 256-bit register 406 are forwarded first followed by the first round key stored in the high order 128-bits of the 256-bit cipher key. The 128-bit round key is stored in register bytes 3:0 prior to being forwarded to the aes data path 102. While the cipher key is being forwarded, the next 128-bit round key is being computed and is stored in the high-order 128-bits of the 256-bit register prior to be stored in the low order 128-bit register prior to being forwarded to the aes data path 102.

Round keys are computed as follows:
if n mod 8 is 0

$$w_n = f(w_{n-1}) \oplus w_{n-8}$$

else $$w_n = w_{n-1} \oplus w_{n-8}$$

The next two 128-bit round keys words $w_{15}:w_{12}$ and words $w_{11}:w_8$ are computed from words $w_7:w_0$ as follows:

$$w_8 = f(w_{11}) \oplus w_0$$

$$w_9 = f(w_{11}) \oplus w_0 \oplus w_1$$

$$w_{10} = f(w_{11}) \oplus w_0 \oplus w_1 \oplus w_2$$

$$w_{11} = f(w_{11}) \oplus w_0 \oplus w_1 \oplus w_2 \oplus w_3$$

$$w_{12} = f(w_{11}) \oplus w_0 \oplus w_1 \oplus w_2 \oplus w_3 \oplus w_4$$

$$w_{13} = f(w_{11}) \oplus w_0 \oplus w_1 \oplus w_2 \oplus w_3 \oplus w_4 \oplus w_5$$

$$w_{14} = f(w_{11}) \oplus w_0 \oplus w_1 \oplus w_2 \oplus w_3 \oplus w_4 \oplus w_5 \oplus w_6$$

$$w_{15} = f(w_{11}) \oplus w_0 \oplus w_1 \oplus w_2 \oplus w_3 \oplus w_4 \oplus w_5 \oplus w_6 \oplus w_7$$

As all of the words w7:w0 are already stored in the 256-bit register, no pre-computation is necessary. Table 6 below illustrates what is stored in the 256-bit register 406 and the temporary register to compute round keys for all 14 rounds of a 256-bit encrypt operation.

TABLE 6

| Round | Key register (256 bits (32-bit words (7:0)) | | | | | | | | |
|---|---|---|---|---|---|---|---|---|---|
| Key # | 7 | 6 | 5 | 4 | 3 | 2 | 1 | 0 | Temp |
| 1 | X | X | X | X | X | X | X | X | X |
| 2 | w3 | w2 | w1 | w0 | w7 | w6 | w5 | w4 | w7 |
| 3 | w7 | w6 | w5 | w4 | w11 | w10 | w9 | w8 | w11 |
| 4 | w11 | w10 | w9 | w8 | w15 | w14 | w13 | w12 | w15 |
| 5 | w15 | w14 | w13 | w12 | w19 | w18 | w17 | w19 |
| 6 | w19 | w18 | w17 | w16 | w23 | w23 | w22 | w21 | w23 |
| 7 | w23 | w22 | w21 | w20 | w27 | w26 | w25 | w24 | w27 |
| 8 | w27 | w26 | w25 | w24 | w31 | w30 | w29 | w28 | w31 |
| 9 | w31 | w30 | w29 | w28 | w35 | w34 | w33 | w32 | w35 |
| 10 | w35 | w34 | w32 | w33 | w39 | w38 | w37 | w36 | w39 |
| 11 | w39 | w38 | w37 | w36 | w43 | w42 | w41 | w40 | w43 |
| 12 | w43 | w42 | w41 | w40 | w47 | w46 | w45 | w44 | w47 |
| 13 | w47 | w46 | w45 | w44 | w51 | w50 | w49 | w48 | w51 |
| 14 | w51 | w50 | w49 | w48 | w55 | w54 | w53 | w52 | w55 |

TABLE 6-continued

| Round | Key register (256 bits (32-bit words (7:0)) | | | | | | | | |
|---|---|---|---|---|---|---|---|---|---|
| Key # | 7 | 6 | 5 | 4 | 3 | 2 | 1 | 0 | Temp |
| 15 | X | X | X | X | w59 | w58 | w57 | w56 | X |

XOR logic 408, 412 also manipulates 128-bit, 192-bit and 256-bit cipher keys for decryption operations to allow on-the-fly computation of 128-bit round keys in a similar manner to the computation of round keys for encrypt operations.

The expansion key for 10 rounds of the 128-bit key has 44 32-bit words labeled w43-w0. The decrypt operation starts with words w43:w40. Table 7 below illustrates the contents of the 256-bit key register 406 and the temporary register for each decrypt round for a decrypt operation based on a 128-bit cipher key.

TABLE 7

| Round | Key register (256 bits (32-bit words (7:0)) | | | | | | | | |
|---|---|---|---|---|---|---|---|---|---|
| Key # | W7 | W6 | W5 | W4 | W3 | W2 | W1 | W0 | Temp |
| 1 | w39 | w38 | X | X | X | X | X | X | w39 |
| 2 | w35 | w34 | X | X | w39 | w38 | w37 | w36 | w35 |
| 3 | w31 | w30 | X | X | w35 | w34 | w33 | w32 | w31 |
| 4 | w27 | w26 | X | X | w31 | w30 | w29 | w28 | w27 |
| 5 | w23 | w22 | X | X | w27 | w26 | w25 | w24 | w23 |
| 6 | w19 | w18 | X | X | w23 | w22 | w21 | w20 | w19 |
| 7 | w15 | w14 | X | X | w19 | w18 | w17 | w16 | w15 |
| 8 | w11 | w10 | X | X | w15 | w14 | w13 | w12 | w11 |
| 9 | w7 | w6 | X | X | w11 | w10 | w9 | w8 | w7 |
| 10 | w3 | w2 | X | X | w7 | w6 | w5 | w4 | w3 |
| 11 | w39 | w38 | X | X | w3 | w2 | w1 | w0 | w39 |

Knowing that 32-bit words labeled w43:w40 were computed during an encryption operation as follows:

$$w_{40} = f(w_{39}) \oplus w_{36}$$

$$w_{41} = f(w_{39}) \oplus w_{36} \oplus w_{37}$$

$$w_{42} = f(w_{39}) \oplus w_{36} \oplus w_{37} \oplus w_{38}$$

$$w_{43} = f(w_{39}) \oplus w_{36} \oplus w_{37} \oplus w_{38} \oplus w_{39}$$

The first decrypt round key can be computed using words w43:w40 as follows:

$$w_{36} = f(w_{39}) \oplus w_{40}$$

$$w_{37} = w_{40} \oplus w_{41}$$

$$w_{38} = w_{41} \oplus w_{42}$$

$$w_{39} = w_{42} \oplus w_{43}$$

As words $w_{41}$, $w_{42}$ and $w_{43}$ are known from the cipher key, words $w_{38}$ and $w_{39}$ may be pre-computed and stored in the unused high order bits in the 256-bit register 406. As shown in Table 7, two words are pre-computed for each round key and may be used to generate the other words for the round key.

Table 8 below illustrates the contents of the 256-bit key register and the temporary register for each decrypt round for a 192-bit cipher key.

TABLE 8

| Round | Key register (256 bits (32-bit words (7:0)) | | | | | | | | |
|---|---|---|---|---|---|---|---|---|---|
| Key # | 7 | 6 | 5 | 4 | 3 | 2 | 1 | 0 | Temp |
| 1 | w47 | w46 | w45 | w44 | X | X | X | X | w47 |
| 2 | w43 | w42 | w41 | w40 | w47 | w46 | w45 | w44 | w41 |
| 3 | w39 | w38 | w37 | w36 | w43 | w42 | w41 | w40 | X |
| 4 | w35 | w34 | w33 | w32 | w39 | w38 | w37 | w36 | w35 |
| 5 | w31 | w30 | w29 | w28 | w35 | w34 | w33 | w32 | w29 |
| 6 | w27 | w26 | w25 | w24 | w31 | w30 | w29 | w28 | X |
| 7 | w23 | w22 | w21 | w20 | w27 | w26 | w25 | w24 | w23 |
| 8 | w19 | w18 | w17 | w16 | w23 | w22 | w21 | w20 | w17 |
| 9 | w15 | w14 | w13 | w12 | w19 | w18 | w17 | w16 | X |
| 10 | w11 | w10 | w9 | w8 | w15 | w14 | w13 | w12 | w11 |
| 11 | w7 | w6 | w5 | w4 | w11 | w10 | w9 | w8 | w5 |
| 12 | w3 | w2 | w1 | w0 | w7 | w6 | w5 | w4 | X |
| 13 | w47 | w46 | w45 | w44 | w3 | w2 | w1 | w0 | w47 |

As in the case of an encryption operation based on a 192-bit cipher key, a 192-bit cipher key decrypt is more complicated than either 128-bit or 256-bit encrypt/decrypt due to the need to align the 6-word (192-bit) cipher key with the 4-word (128-bit) round key. The encrypt operation starts with a cipher key that stores words labeled w53:w48 of the 54 word expansion key. Words w53:w48 of the cipher key have the following relationship to other words of the expansion key as follows:

$$w_{48}=f(w_{47})\oplus w_{42}$$

$$w_{49}=w_{48}\oplus w_{43}$$

$$w_{50}=w_{49}\oplus w_{44}$$

$$w_{51}=w_{50}\oplus w_{45}$$

$$w_{52}=w_{51}\oplus w_{46}$$

$$w_{53}=w_{52}\oplus w_{47}$$

Knowing words $W_{53}:w_{48}$, the words for the next round key may be pre-computed as follows while words $w_{48}:w_{51}$ are forwarded to the aes data path 103:

$$w_{44}=f(w_{49})\oplus w_{50}$$

$$w_{45}=f(w_{50})\oplus w_{51}$$

$$w_{46}=f(w_{51})\oplus w_{52}$$

$$w_{47}=f(w_{52})\oplus w_{53}$$

Words w53:w52 are used to compute the next round key which is stored in the pre-compute register. These two words are then discarded, that is, not forwarded to the aes data path 103. Word $w_{47}$ is stored (registered) in the temporary register for pipelining purposes to eliminate delay in the critical path.

On the next clock cycle, after the pre-computed round key has been moved to the output register (lower order bits of the 256-bit register 406), the next round key may be pre-computed in the pre-compute register (high order bits of the 256-bit register).

On each clock cycle the next round key is pre-computed in the pre-compute register and then moved to the output register on the next clock cycle. Due to the need to align from a 6-word cipher key to a 4-word round key, the decrypt operations repeat every 3 clock cycles with the temporary register not needed every third clock cycle of the decrypt operation as shown in Table 3.

Furthermore, as the operation is pipelined and there is a pre-compute cycle prior to each output cycle, a subsequent decrypt operation can occur on the next clock cycle after the prior decrypt operation has completed, that is, back-to-back decrypt operations are allowed with no intervening idle clock cycles required.

TABLE 9

| Round | Key register (256 bits (32-bit words (7:0)) | | | | | | | | |
|---|---|---|---|---|---|---|---|---|---|
| Key # | 7 | 6 | 5 | 4 | 3 | 2 | 1 | 0 | Temp |
| 1 | X | X | X | X | X | X | X | X | X |
| 2 | w59 | w58 | w57 | w56 | w55 | w50 | w49 | w48 | w55 |
| 3 | w55 | w54 | w53 | w52 | w51 | w38 | w37 | w36 | w51 |
| 4 | w51 | w50 | w49 | w48 | w47 | w46 | w45 | w44 | w47 |
| 5 | w47 | w46 | w45 | w44 | w43 | w42 | w41 | w40 | w43 |
| 6 | w43 | w42 | w41 | w40 | w39 | w38 | w37 | w36 | w39 |
| 7 | w39 | w38 | w37 | w36 | w35 | w34 | w33 | w32 | w35 |
| 8 | w35 | w34 | w33 | w32 | w31 | w30 | w29 | w28 | w31 |
| 9 | w31 | w30 | w29 | w28 | w27 | w26 | w25 | w24 | w27 |
| 10 | w27 | w26 | w25 | w24 | w23 | w22 | w21 | w20 | w23 |
| 11 | w23 | w22 | w21 | w20 | w19 | w18 | w17 | w16 | w19 |
| 12 | w19 | w18 | w17 | w16 | w15 | w14 | w13 | w12 | w15 |
| 13 | w15 | w14 | w13 | w12 | w11 | w10 | w9 | w8 | w11 |
| 14 | w11 | w10 | w9 | w8 | w7 | w6 | w5 | w4 | w7 |
| 15 | w7 | w6 | w5 | w4 | w3 | w2 | w1 | w0 | X |

Table 9 above illustrates the contents of the 256-bit key register 406 and the temporary register for each decrypt round for a 256-bit cipher key.

As in the case of 256-bit encrypt operation, all bits in the 256-bit register are used to store the words. As eight words are available on each clock cycle, no pre-compute is required, and the words to be forwarded to the aes data path 103 for each round are moved to the lower-order 128-bits of the 256-bit register to provide the 4 32-bit words (128-bit round key) to the aes data path 103.

Figure 5:
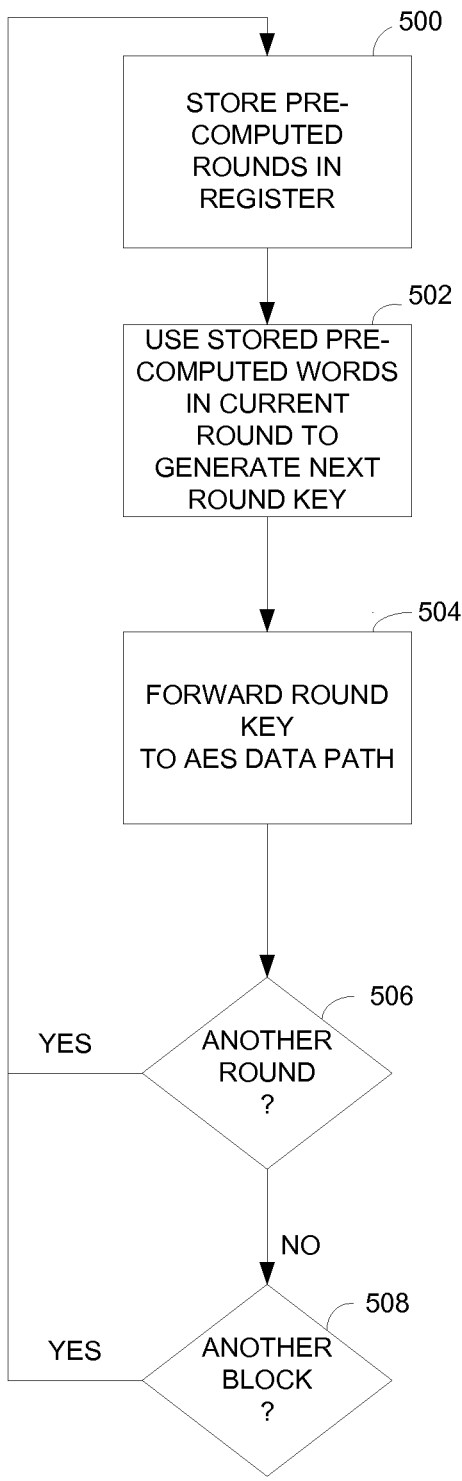
FIG. 5 is a flow graph illustrating an embodiment of a method performed by key expansion to generate round keys.

FIG. 5 is a flowgraph illustrating an embodiment of a method performed by key expansion to generate round keys.

At block 500, words pre-computed for a previous round key are stored in register 406 for use in computing subsequent keys. The pre-computed words may be words forwarded in a previous round key or words derived from words forwarded in a previous round key. Processing continues with block 502.

At block 502, the stored pre-computed words are used in the current clock cycle to generate the next round key. Processing continues with block 504.

At block 504, the next round key is forwarded to the aes data path 104. Processing continues with block 506.

At block 506, if there is another round key to be generated for the current data block encrypt/decrypt operation, processing continues with block 500. If not, processing continues with block 508.

At block 508, if there is another block encrypt/decrypt operation, processing continues with block 500 to generate the next round key on the next clock cycle. If not, processing is complete.

It will be apparent to those of ordinary skill in the art that methods involved in embodiments of the present invention may be embodied in a computer program product that includes a computer usable medium. For example, such a computer usable medium may consist of a read only memory device, such as a Compact Disk Read Only Memory (CD ROM) disk or conventional ROM devices, or a computer diskette, having a computer readable program code stored thereon.

While embodiments of the invention have been particularly shown and described with references to embodiments thereof, it will be understood by those skilled in the art that various changes in form and details may be made therein without departing from the scope of embodiments of the invention encompassed by the appended claims.

The invention claimed is:

1. An apparatus comprising:
   a key scheduler comprising:
   a key expansion to generate a round key of an expanded key per clock cycle, the round key based on a cipher key; and
   a memory to store pre-computed words for a current round key to forward the current round key to a data path for use by a round operation in a current clock cycle, the key expansion to generate a next round key in the current clock cycle for use in a next clock cycle based on the stored pre-computed words, the memory comprises a temporary register, the temporary register to store one word of the current round key for use by a SubWord function to generate the next round key while the current round key is used in the data path.

2. The apparatus of claim 1, wherein the stored pre-computed words are dependent on a type of operation and a size of the cipher key.

3. The apparatus of claim 2, wherein the type of operation is encrypt or decrypt.

4. The apparatus of claim 1, wherein the round operation is an Advanced Encryption Standard (AES) round operation.

5. The apparatus of claim 1, wherein the next round key generated in the current clock cycle is a first round key in a next expanded key.

6. The apparatus of claim 5, wherein the memory is a 256-bit register, the cipher key is 128-bits and the round key, the next round key, the current round key and the first round key are 128-bits.

7. The apparatus of claim 5, wherein the memory is a 256-bit register, the cipher key is 192-bits and the round key, the next round key, the current round key and the first round key are 128-bits.

8. The apparatus of claim 5, wherein the memory is a 256-bit register, the cipher key is 256-bits and the round key, the next round key, the current round key and the first round key are 128-bits.

9. The apparatus of claim 1, wherein the key expansion to compute a first round key before the cipher key is first used in the data path.

10. A method comprising:
    generating, by a key scheduler in a processor, a round key of an expanded key per clock cycle based on a cipher key;
    storing, in a memory in the key scheduler, pre-computed words for a current round key to forward to a data path in the processor for use by a round operation in a current clock cycle; and
    generating, by the key scheduler a next round key in the current clock cycle for use in a next clock cycle based on the stored pre-computed words, the memory comprises a temporary register, the temporary register to store one word of the current round key for use by a SubWord function to generate the next round key while the current round key is used in the data path.

11. The method of claim 10, wherein the stored pre-computed words are dependent on a type of operation and a size of the cipher key.

12. The method of claim 11, wherein the type of operation is encrypt or decrypt.

13. The method of claim 10, wherein the round operation is an Advanced Encryption Standard (AES) round operation.

14. The method of claim 10, wherein the next round key generated in the current clock cycle is a first round key in a next expanded key.

15. The method of claim 10, wherein the memory is a 256-bit register, the cipher key is 128-bits and the round key, the next round key, the current round key and the first round key are 128-bits.

16. The method of claim 10, wherein the memory is a 256-bit register, the cipher key is 192-bits and the round key, the next round key, the current round key and the first round key are 128-bits.

17. The method of claim 10, wherein the memory is a 256-bit register, the cipher key is 256-bits and the round key, the next round key, the current round key and the first round key are 128-bits.

18. The method of claim 10, wherein the key scheduler compute a first round key before the cipher key is first used in the data path.

* * * * *